(12) United States Patent
Pinho

(10) Patent No.: US 7,362,506 B2
(45) Date of Patent: Apr. 22, 2008

(54) ULTRA-BRIGHT LIGHT ENGINE FOR PROJECTION DISPLAYS

(75) Inventor: George P. Pinho, Waterloo (CA)

(73) Assignee: Christie Digital Systems, Inc., Ontario (CA)

( * ) Notice: Subject to any disclaimer, the term of this patent is extended or adjusted under 35 U.S.C. 154(b) by 0 days.

(21) Appl. No.: 11/741,700

(22) Filed: Apr. 27, 2007

(65) Prior Publication Data
US 2007/0285796 A1    Dec. 13, 2007

Related U.S. Application Data

(62) Division of application No. 11/115,311, filed on Apr. 27, 2005, now Pat. No. 7,230,768.

(51) Int. Cl.
G02B 27/14 (2006.01)
G02B 1/10 (2006.01)
G02B 5/28 (2006.01)
G03B 21/26 (2006.01)
H04N 9/07 (2006.01)

(52) U.S. Cl. ............ 359/634; 359/583; 359/585; 359/588; 359/589; 353/20; 353/31; 353/34; 353/97; 348/336; 348/339

(58) Field of Classification Search ............ 359/580, 359/583, 586–589, 618, 619, 634, 640, 831, 359/585, 630; 353/20, 31, 33, 34, 81, 97; 348/338, 339, 336, 784; 349/8; 313/110, 313/112, 375

See application file for complete search history.

(56) References Cited

U.S. PATENT DOCUMENTS

| | | | | |
|---|---|---|---|---|
| 2,589,930 A * | 3/1952 | Widdop et al. | ............ | 359/583 |
| 2,740,317 A * | 4/1956 | Kelly et al. | ............ | 359/588 |
| 2,749,792 A * | 6/1956 | Kelly | ............ | 359/583 |
| 2,750,832 A * | 6/1956 | Morgan | ............ | 359/585 |
| 2,945,413 A * | 7/1960 | Kelly | ............ | 359/583 |
| 3,349,170 A * | 10/1967 | Michels et al. | ............ | 348/336 |
| 4,715,684 A * | 12/1987 | Gagnon | ............ | 349/8 |
| 5,044,727 A | 9/1991 | Steinle | | |
| 5,371,543 A * | 12/1994 | Anderson | ............ | 348/270 |
| 5,786,937 A | 7/1998 | Chu et al. | | |
| 5,914,817 A * | 6/1999 | Browning et al. | ............ | 359/634 |
| 5,986,815 A | 11/1999 | Bryars | | |

(Continued)

FOREIGN PATENT DOCUMENTS

EP    1 227 358 A2    7/2002

(Continued)

OTHER PUBLICATIONS

PCT International Search Report mailed Aug. 10, 2006, in PCT International Application No. PCT/CA2006/00686 (3 pages).

Primary Examiner—Ben Loha
(74) Attorney, Agent, or Firm—Staas & Halsey LLP (57) ABSTRACT

A projector incorporating a prism and a plurality of light valves for modulating light that passes though the prism, wherein the color splitting-converging prism includes a dichroic coating having multiple layers of high and low index of refraction and ¼ wavelength thickness at each desired angle of incidence for reducing dichroic shift and thereby minimizing light loss.

7 Claims, 8 Drawing Sheets

U.S. PATENT DOCUMENTS

| | | |
|---|---|---|
| 5,999,321 A | 12/1999 | Bradley |
| 6,144,498 A | 11/2000 | Bryars et al. |
| 6,549,338 B1 * | 4/2003 | Wolverton et al. .......... 359/634 |
| 2005/0157275 A1 * | 7/2005 | Colpaert et al. .............. 353/97 |
| 2005/0225730 A1 | 10/2005 | Sannohe |

FOREIGN PATENT DOCUMENTS

| | | |
|---|---|---|
| JP | 11-202127 | 7/1999 |

* cited by examiner

Figure 1

Prior Art

Figure 2

Prior Art

ULTRA-BRIGHT LIGHT ENGINE FOR PROJECTION DISPLAYS

CROSS-REFERENCE TO RELATED APPLICATIONS

This application is a Divisional Application of and claims parent benefit under 35 U.S.C. §120 to application Ser. No. 11/115,311, filed Apr. 27, 2005, now U.S. Pat. No. 7,230,768, the disclosure of which is incorporated herein by reference.

BACKGROUND OF THE INVENTION

1. Field of the Invention

The present invention is directed to digital projectors incorporating light engines with color splitting-converging prisms, and more particularly to a color splitting-converging prism incorporating a coating for reducing dichroic shift and thereby minimizing light loss.

2. Description of the Related Art

A typical color digital projector consists of a lamp, an illumination system, and a color splitting-recombining prism. Attached to the prism is an imaging device, typically a digital micromirror device (DMD) panel. The imaging device receives a light cone from the lamp and modulates the light to create an image on the screen.

The DMD is an electromechanical device consisting of millions of microscopic mirrors that modulates light by independently flipping each mirror through a +−12 degree angle. The design of the DMD requires creation of a light cone with an f/#2.4-2.5 for maximum light throughput in the projector. Using three such DMDs on a prism (e.g. Phillips® prism, plumbicon, etc.), a white light cone of f/2.4 can be separated into red, green, and blue. Each color is individually modulated by the DMD and then recombined by the prism.

The design of the plumbicon prism requires that the dichroic coatings be designed for large angles of incidence relative to normal (i.e. 90°). Typically, the dichroic coatings are designed for angles of 12-59 degrees from the normal incident ray. When light of f/2.4 strikes such a coating the dichroic shift is large above 20 degrees AOI. The dichroic shift limits the collection efficiency for light rays in the range of from approximately 30-59 degrees. This lowers the efficiency of light transmission in the prism and contributes to increased heating of the prism.

Accordingly, it is an objective of the present invention to provide a prism that reduces dichroic shift and thereby increases light transmission efficiency.

SUMMARY OF THE INVENTION

Therefore, according to an aspect of the present invention a dichroic coating is provided for a prism, having multiple layers of high and low index of refraction and ¼ wavelength thickness at each desired angle of incidence.

These together with other aspects and advantages that will be subsequently apparent reside in the details of construction and operation as more fully hereinafter described and claimed, reference being had to the accompanying drawings forming a part hereof wherein like numerals refer to like parts throughout.

DETAILED DESCRIPTION OF THE PREFERRED EMBODIMENTS

Figure 1:
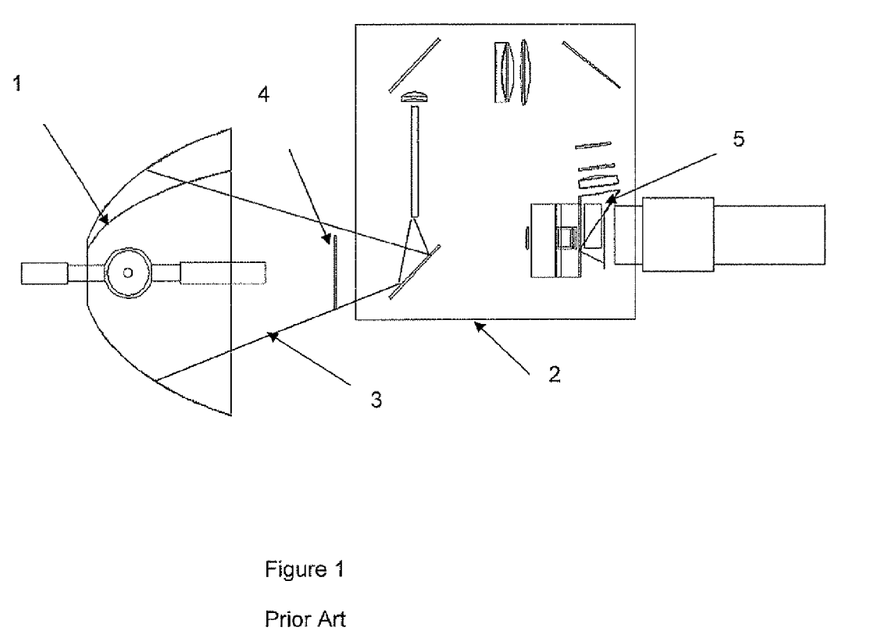
FIG. 1 is a digital three-chip projector, according to the prior art.
Figure 2:
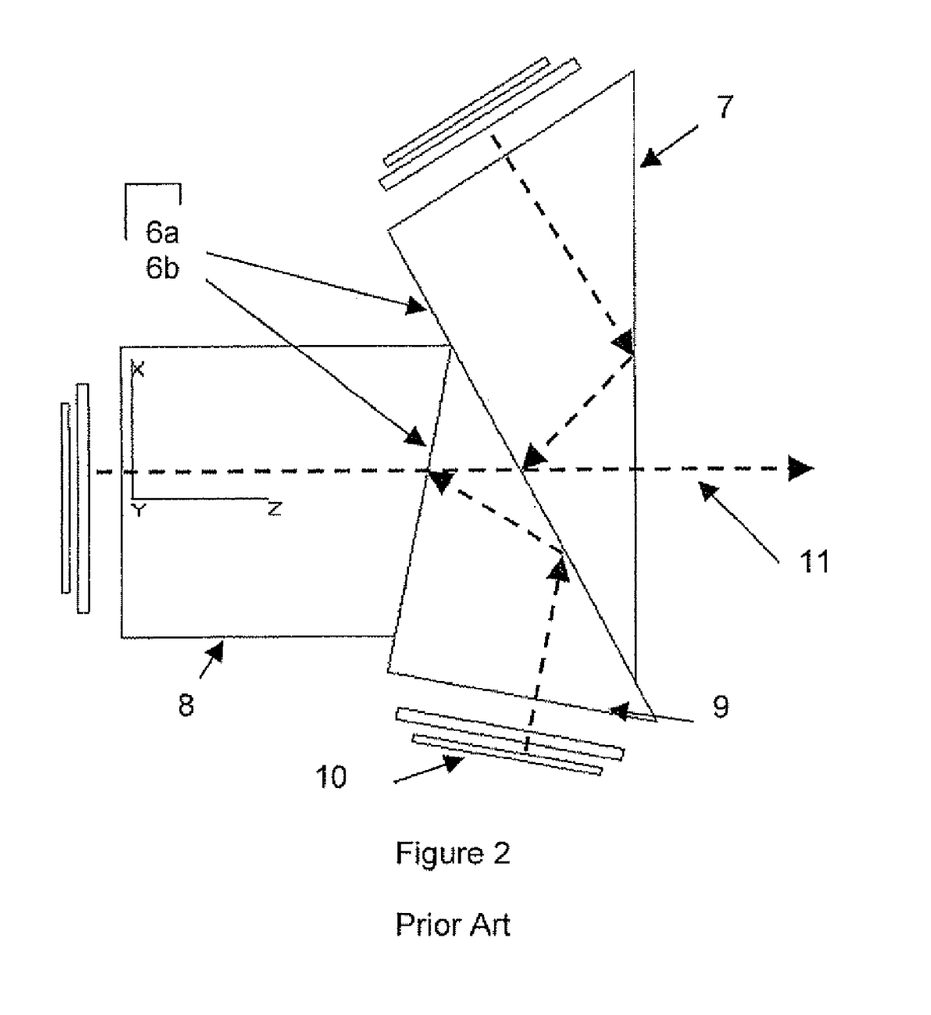
FIG. 2 is a schematic representation of a plumbicon prism used for DMD panel display devices, according to the prior art.

FIG. 1 shows a typical three-chip projector comprising a Xenon lamp and parabolic reflector (1) for creating a light cone (3) that passes through a UV filter (4) into an illumination system (2), including an integrator rod and lenses for telecentric illumination. A color splitting-converging prism (5) typically comprises a plumbicon prism (for DMD panels) as shown in FIG. 2. The prism elements contain dichroic coatings (6) to separate the incoming white light into blue (7), green (8), and red (9), as discussed in greater detail below. Each color is then separately modulated at each display device or light valve (10), such as by a DMD. The terms "display device" and "light valve" are used interchangeably throughout this disclosure. The display devices reflect the modulated light, which is re-converged (11) by the prism and projected by a projection lens onto a screen to produce an image. In the three-chip design, convergence mechanisms are placed on the display devices to assist in field alignment in the event that the unit develops misconvergence of color.

Figure 3:
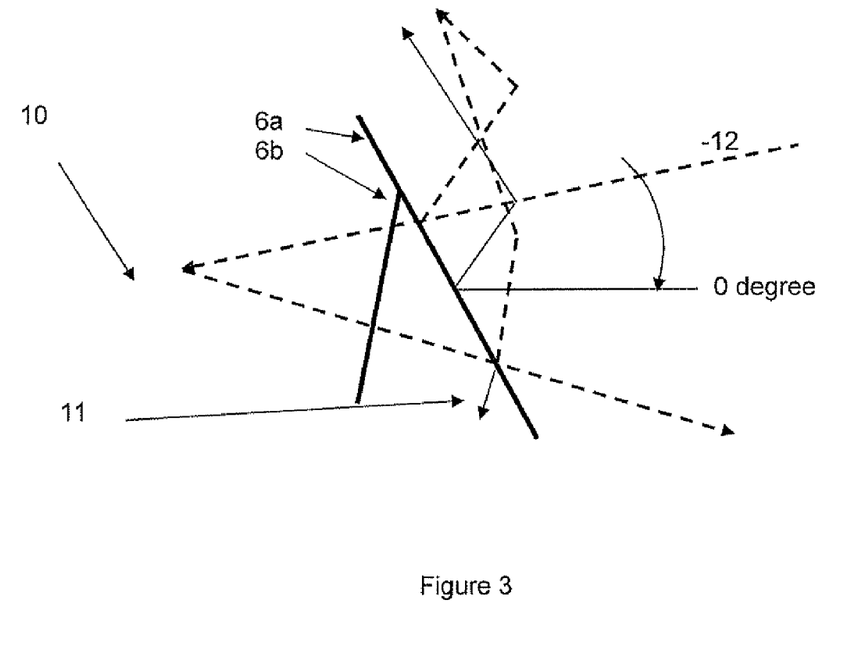
FIG. 3 is a schematic representation of the plumbicon prism of FIG. 2, showing blue and red dichroic filter coatings and the path of a light ray at 12 degrees to the normal.

As discussed above, DMD (10) is an electromechanical device consisting of millions of microscopic mirrors that modulate light by independently flipping each mirror through a +−12 degree angle. FIG. 3 shows a top view of a 3-chip prism with blue and red dichroic filter coatings, 6a and 6b, and the path that a f/2.4 light cone takes towards the DMD (10) on the blue channel. The dotted edge ray of the light cone represents an angle of 12 degrees to the normal ray (shown for blue and green only) and is equivalent to the tilt angle of the DMD (10). Reference numeral (11) represents light trapped as a result of dichroic shift on the return path.

The design of the plumbicon prism requires that the dichroic coatings (6) be at large angles relative to the normal. Typically, the dichroic coatings range in angles of 49-59 degrees from the normal ray (0 degrees) for the blue coating (6a) and 12-30 degrees for the red coating (6b) in FIG. 3. When light of f/2.4 strikes such a coating the dichroic shift is large between the 0 and 12 degree incident rays in FIG. 3 and as shown in FIGS. 4a and 4b, for blue and red prism coatings, respectively.

Figure 5:
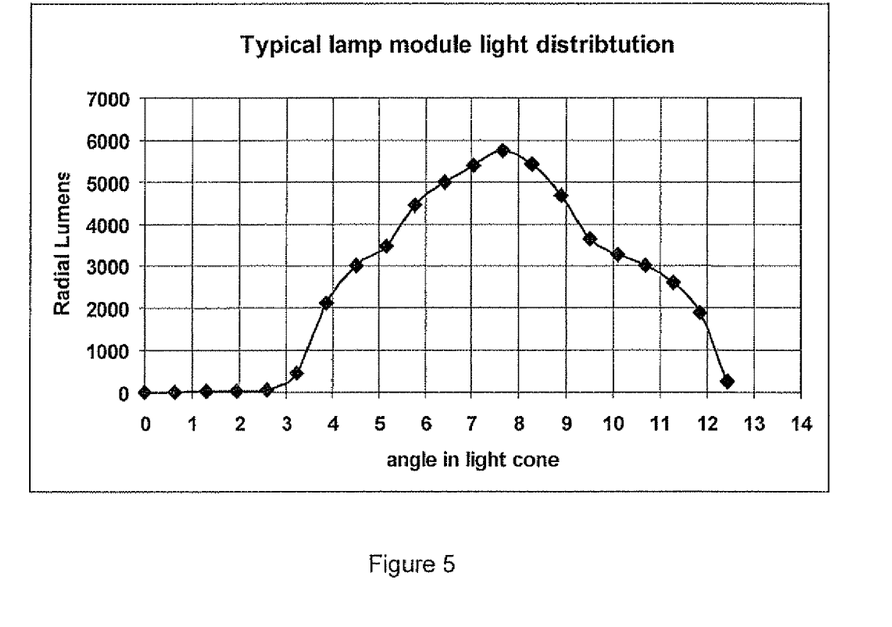
FIG. 5 shows a typical distribution of light in the light cone entering the prism of FIGS. 2 and 3.

Also, as discussed above, the efficiency of light transmission through the projector is affected by the distribution of light from the lamp module (1). The typical lamp module for a DMD projector is designed to produce a light cone (3) in the range of f/1.0 to f/1.5 depending on the lamp. Magnification by the illumination system (2) changes the f/# of the light cone to match the characteristics of the DMD (10) while preserving Etendue. The distribution of light rays in the light cone (3) on the prism (5) depends on the arc-gap of the lamp, the lamp power, and the reflector that is used to form the light cone. FIG. 5 depicts the distribution of light from a typical lamp and reflector within the light cone (3).

Figure 4A:
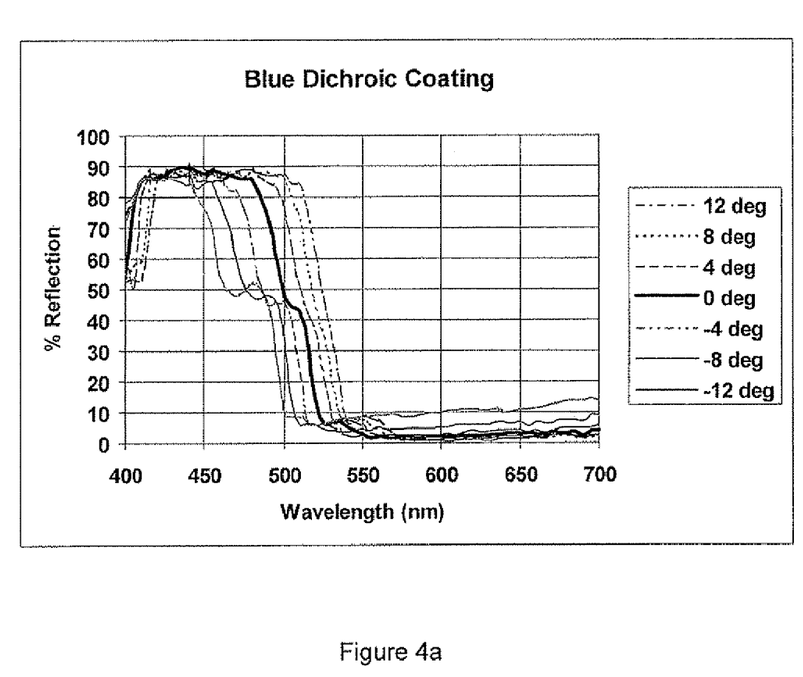
FIG. 4a shows typical dichroic shift for light rays incident on a blue dichroic coating at angles ranging from −12° to +12° to the normal.
Figure 4B:
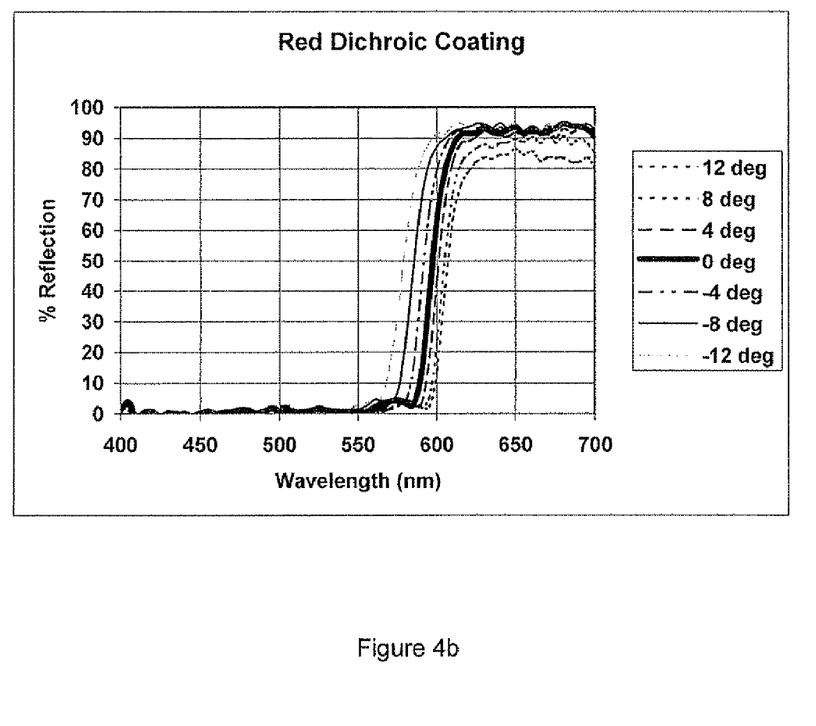
FIG. 4b shows typical dichroic shift for light rays incident on a red dichroic coating at angles ranging from −12° to +12° to the normal.

The dichroic shift shown in FIGS. 4a and 4b limits the collection efficiency for light rays incident in the range 9-12 degrees. A ray from the lamp (1) at −12° (FIG. 4) experiences a large dichroic shift at the coating, as shown in FIG. 4a. The large shift allows only wavelengths from 400-450 nm to strike the blue DMD (10). The rest of the light is transmitted to the green and red DMD's. Upon reflection, the rays emerge at an angle of +12°. The light rays reflected from the blue DMD are efficiently reflected to the projection lens, but the large dichroic shift in the opposite direction traps the light rays reflected from the green DMD (11). This lowers the efficiency of light transmission in the prism (5) and contributes to increased heating of the prism. A similar condition occurs at the red dichroic coatings.

The effect of dichroic shift in the prism (5) lowers transmission of light at the oblique angles of incidence. For a typical lamp (1) this causes increased heating in the prism and a reduction in projector efficiency by as much as 25%.

Therefore, in accordance with the present invention novel coatings are provided for dramatically reducing dichroic shift and therefore reducing light loss in the prism (5). The design of the coatings requires additional layers to achieve the desired effect. According to the preferred embodiment, the following coating formulations were created:

Blue Dichroic Coating Design

| Thickness (um) | Material |
|---|---|
| 0.19066 | MgF2 |
| 0.022637 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.022637 | TiO2 |
| 0.020536 | TiO2 |
| 0.06900095 | SiO2 |
| 0.0425814 | TiO2 |
| 0.06900095 | SiO2 |
| 0.0425814 | TiO2 |
| 0.06900095 | SiO2 |
| 0.020536 | TiO2 |

Red Dichroic Coating Design

| Thickness (um) | Material |
|---|---|
| 0.06514 | SiO2 |
| 0.0803862 | TiO2 |
| 0.1302744 | SiO2 |
| 0.0803862 | TiO2 |
| 0.06514 | SiO2 |
| 0.061165 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.061165 | SiO2 |
| 0.06514 | SiO2 |
| 0.0803862 | TiO2 |
| 0.1302744 | SiO2 |
| 0.0803862 | TiO2 |
| 0.06514 | SiO2 |
| 0.083546 | MgF2 |
| 0.109806 | ZrO2 |
| 0.0707337 | Al2O3 |

Each coating uses TiO2 and SiO2 as the high and low index materials. Specifically, TiO2 has an index of refraction 2.32 and SiO2, an index of refraction 1.46. In addition, matching layers are used at each end of the coating (i.e. the different materials and thicknesses used in the first 4-6 layers and the last 8-9 layers). This helps to match the index of refraction of the coating layers to the air side or the glass side and define the wavelength edges of the dichroic coatings to achieve the correct band pass.

Figure 6:
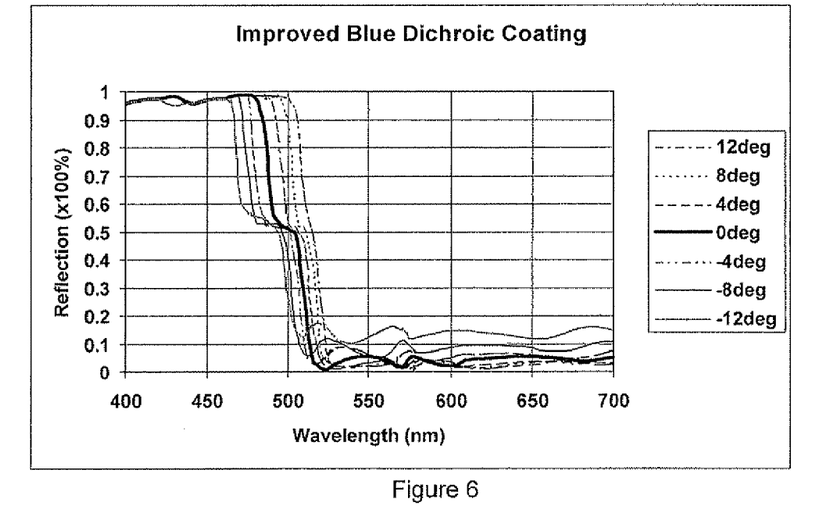
FIGS. 6 and 7 show the dichroic shift for light rays incident on a blue dichroic coating (FIG. 6) and a red dichroic coating (FIG. 7), according to the present invention, at angles ranging from −12° to +12° to the normal.
Figure 7:
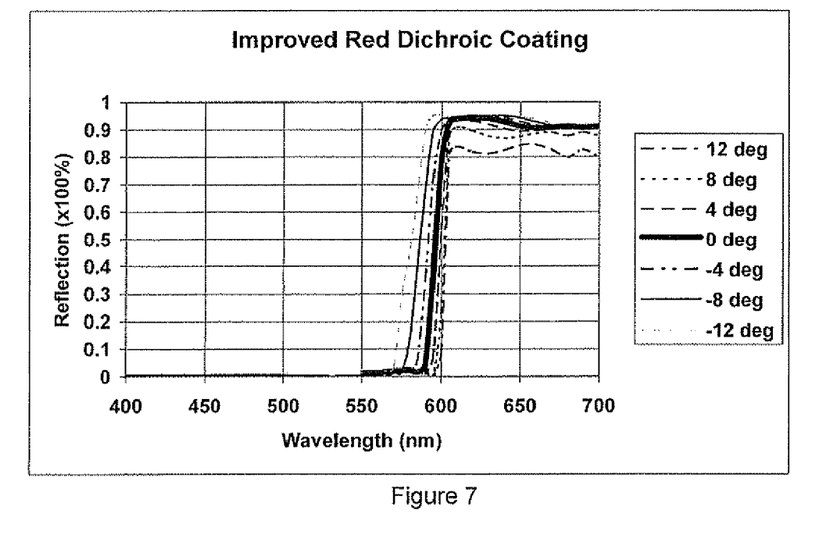

The dichroic shift in FIG. 6 has been reduced to 35 nm at 50% R from the 65 nm @ 50% R in FIG. 4a. In FIG. 7, the shift has been reduced to 23 nm at 50% R from 35 nm @ 50% R in FIG. 4b. This reduction in dichroic shift is the single most important factor in increasing the light transmission through the prism (5). The light rays from 9-12 degrees in the configuration of FIG. 3 experience lower reflection loss within the prism using the novel dichroic coatings of the present invention.

According to another important aspect of the present invention, the steepness of the cut-off at 0 degree is increased for both the blue and red coatings. When the slope of the cut-off for each coating is increased, light in the transition zone between reflection and transmission is better separated into its respective channel. In FIG. 6 the slope of the cut-off has been changed from −2% R/nm to −6% R/nm while in FIG. 7 the slope has been changed from 4% R/nm to 8% R/nm.

According to yet a further aspect of the invention, reflection in the blue and red portions of the spectrum is increased while reducing reflection in the green portion, Measurements have shown an increase in the blue reflection from 90% to 97% and an increase for red from 91% to 93%.

In terms of explaining the manner by which the multi-layer coatings of the present invention function to reduce dichroic shift, it is necessary to consider the theory of muli-layer thin films. A person of skill in the art will understand that an electromagnetic wave incident on a surface of refractive index n1 must satisfy the boundary condition that the magnetic and electric fields be continuous at each interface.

Figure 8:
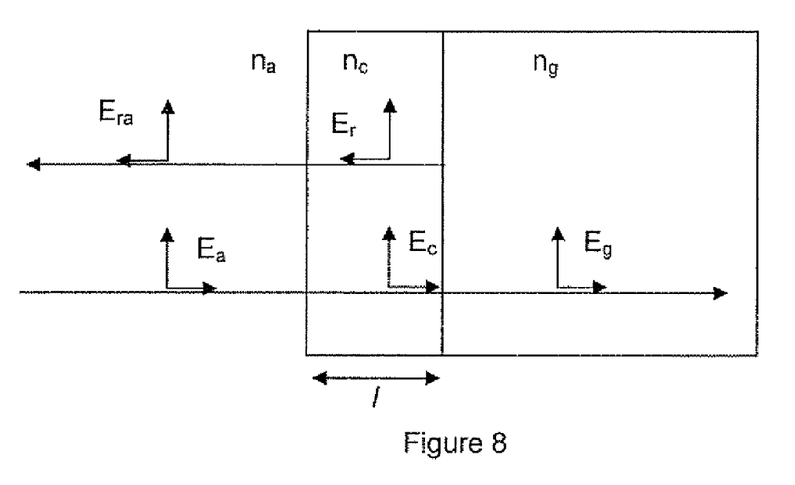
FIG. 8 is a schematic representation of electromagnetic waves incident on a multi-layer thin film coating, as used in the present invention.

In FIG. 8, E represents the electric field vector that is transmitted or reflected in each medium of different index of refraction, and the medium between air and glass represents a coating of thickness l. Since the fields must be continuous, the boundary condition may be solved to obtain:

$$\begin{bmatrix} 1 \\ n_a \end{bmatrix} + \begin{bmatrix} 1 \\ -n_a \end{bmatrix} \frac{E_{ra}}{E_a} = \begin{bmatrix} \cos kl & \frac{-i}{n}\sin kl \\ -in\sin kl & \cos kl \end{bmatrix} \begin{bmatrix} 1 \\ n_g \end{bmatrix} \frac{E_g}{E_a}. \quad (1)$$

In the above equation, kl represents the phase factor and k is equal to:

$$k = 2\pi \frac{n}{\lambda} \cos\theta \quad (2)$$

where θ is the angle of incidence on the coating and n represents the index of refraction of the coating layer for s or p-polarization and is equivalent to:

$$n = n_s = n_c \cos\theta \text{ for } s\text{-polarization and,}$$

$$n = n_p = \frac{n_c}{\cos\theta} \text{ for } p\text{-polarization}$$

These equations show that a dichroic shift between the s and p-polarization will occur at high angles of incidence. As previously discussed, shifts become large above 20 degrees AOI.

The reflection and transmission coefficients are equal to:

$$r = \frac{E_{ra}}{E_a}, t = \frac{E_g}{E_a}.$$

Therefore, equation (1) represents the transmission and reflection of light at the coating interface, which is seen to be dependent on the wavelength of the light, the index of refraction of the coating and the thickness of the coating.

For multi-layer coatings, each coating has its own transfer matrix and equation 1 can be written as:

$$\begin{bmatrix} 1 \\ n_a \end{bmatrix} + \begin{bmatrix} 1 \\ -n_a \end{bmatrix} r = M_1 M_2 M_3 \ldots M_N \begin{bmatrix} 1 \\ n_g \end{bmatrix} t$$

where M represents the transfer matrix for each coating.

In order to create coatings with high reflectance and specific cut off bands, according to the invention, stacks of alternating layers of high and low index of refraction are deposited as discussed above with layer thicknesses that are ¼ wavelength at a desired angle of incidence. The layer thicknesses of ¼ wavelength are required to obtain a phase factor equal to π or 180 degrees, as per equation 2. This creates destructive interference between reflected and transmitted waves at the coatings and permits the design of coatings that are wavelength selective and have high reflectance. For an alternating stack on N layers with index of refraction, $n_H$ and $n_L$, equation (1) can be re-written as:

$$\begin{bmatrix} 1 \\ n_a \end{bmatrix} + \begin{bmatrix} 1 \\ -n_a \end{bmatrix} r = \begin{bmatrix} \left(\frac{-n_H}{n_L}\right)^N & 0 \\ 0 & \left(\frac{-n_L}{n_H}\right)^N \end{bmatrix} \begin{bmatrix} 1 \\ n_g \end{bmatrix} t.$$

Increasing the number of layers results in an increase in reflectivity. Typically, 20-30 layers are chosen for highly reflective stacks. To broaden the reflective regions or change the cut-offs for a reflective coating at various angles of incidence, different thickness layers can be added to the alternating stack to control cut-offs and angle of incidence sensitivity.

To minimize dichroic shift, the thicknesses of the layers are calculated from equation (2) at the mean angles of incidence for the dichroic coating. For example, the mean angle of incidence for the blue dichroic coating is 53.5 degrees. In addition, a match angle can be used which allows for a design to be matched to one angle, α, but used at another, β. Equation (2) can be re-written as:

$$k = 2\pi \frac{n}{\lambda} \cos\beta \frac{\sqrt{1 - (n_a \sin\alpha/n)^2}}{\sqrt{1 - (n_a \sin\beta/n)^2}}. \quad (3)$$

In using this equation, the layer thickness is chosen to reduce the dichroic shift to a desired value. In addition, the index of refraction is chosen to be as high as practically possible to further reduce the dichroic shift.

A successful prototype of the invention applied to a prism within a projector utilizing a 2.4 kW bubble lamp with the light distribution of FIG. 4, yielded the following improvements in light output:

| Coating design | Projector ANSI lumens |
| --- | --- |
| Standard dichroic coating | 13500 |
| Improved dichroic coating | 16875 |

The measured 25% improvement in light output are believed to be achievable only with the novel coatings set forth above.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, failing within the scope of the invention.

What is claimed is:

1. For use in a projector incorporating a light engine with color splitting-converging prisms, the improvement comprising a dichroic coating having multiple layers of high and low index of refraction and index matching layers, wherein layer thicknesses and materials for said multiple layers are chosen to provide prism dichroic coatings with dichroic shifts of less than 65 nm and less than 35 nm for blue and red, respectively, and thereby increase light throughput.

2. The improvement of claim 1, wherein said dichroic coating comprises alternating layers of TiO2 and SiO2.

3. The improvement of claim 2, wherein said dichroic coating for the color blue is comprised of:

| Thickness (um) | Material |
|---|---|
| 0.19066 | MgF2 |
| 0.022637 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.045302 | TiO2 |
| 0.073405 | SiO2 |
| 0.022637 | TiO2 |
| 0.020536 | TiO2 |
| 0.06900095 | SiO2 |
| 0.0425814 | TiO2 |
| 0.06900095 | SiO2 |
| 0.0425814 | TiO2 |
| 0.06900095 | SiO2 |
| 0.020536 | TiO2. |

4. The improvement of claim 2, wherein said dichroic coating for the color red is comprised of:

| Thickness (um) | Material |
|---|---|
| 0.06514 | SiO2 |
| 0.0803862 | TiO2 |
| 0.1302744 | SiO2 |
| 0.0803862 | TiO2 |
| 0.06514 | SiO2 |
| 0.061165 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.1223303 | SiO2 |
| 0.07548 | TiO2 |
| 0.061165 | SiO2 |
| 0.06514 | SiO2 |
| 0.0803862 | TiO2 |
| 0.1302744 | SiO2 |
| 0.0803862 | TiO2 |
| 0.06514 | SiO2 |
| 0.083546 | MgF2 |
| 0.109806 | ZrO2 |
| 0.0707337 | Al2O3. |

5. The improvement of claim 2, wherein said layer thicknesses and materials for said multiple layers are chosen to provide prism dichroic coatings with dichroic shifts of approximately 35 nm and 23 nm for blue and red, respectively.

6. Use of the improvement according to claim 1 in a 3-chip DMD projector utilizing one of either a Xe or UHP lamp with f#1.0-1.5.

7. Use of the improvement according to claim 1 in at least a 5-element prism within a 3-chip DMD projector.

* * * * *

UNITED STATES PATENT AND TRADEMARK OFFICE
CERTIFICATE OF CORRECTION

PATENT NO. : 7,362,506 B2  Page 1 of 1
APPLICATION NO. : 11/741700
DATED : April 22, 2008
INVENTOR(S) : George P. Pinho It is certified that error appears in the above-identified patent and that said Letters Patent is hereby corrected as shown below:

On the Title Page:
Item [73] (Assignee), Line 1, change "Christie Digital Systems, Inc.," to
--Christie Digital Systems Canada, Inc.,--

Signed and Sealed this

Thirty-first Day of March, 2009

JOHN DOLL
*Acting Director of the United States Patent and Trademark Office*